United States Patent [19]

Mimura et al.

[11] Patent Number: 5,282,045
[45] Date of Patent: Jan. 25, 1994

[54] DEPTH-OF-FIELD CONTROL APPARATUS AND IMAGE PICKUP APPARATUS HAVING THE SAME THEREIN

[75] Inventors: Itaru Mimura, Sayama; Kenji Takahashi, Kanagawa; Toshiyuki Akiyama, Tokorozawa; Yoshizumi Eto, Sagamihara; Naoki Ozawa, Akishima; Takahiro Matsumoto, Hachioji, all of Japan

[73] Assignees: Hitachi, Ltd.; Hitachi Denshi Kabushiki Kaisha, both of Tokyo, Japan

[21] Appl. No.: 689,626

[22] Filed: Apr. 23, 1991

[30] Foreign Application Priority Data

Apr. 27, 1990 [JP] Japan .................. 2-110061

[51] Int. Cl.$^5$ ............................ H04N 5/232
[52] U.S. Cl. ...................... 358/227; 358/105
[58] Field of Search ............... 358/227, 216, 213.15, 358/213.22, 105; 382/16, 22, 54

[56] References Cited

U.S. PATENT DOCUMENTS

| 4,404,594 | 9/1983 | Hannan | 358/209 |
| 4,584,704 | 4/1986 | Ferren | 382/65 |
| 5,031,049 | 7/1991 | Toyama et al. | 358/227 |

FOREIGN PATENT DOCUMENTS

| 1-309478 | 12/1989 | Japan | H04N 5/30 |
| 2-212809 | 8/1990 | Japan | H04N 5/232 |

OTHER PUBLICATIONS

Sugimoto et al., "Digital Composition of Images with Increased Depth of Focus Considering Depth Information" Applied Optics, vol. 24, No. 14, Jul. 15, 1985, pp. 2076-2080.
National Conference Record of the Institute of Electronics and Communication Engineers of Japan, 83/10, vol. J66-D, No. 10.

Primary Examiner—Joseph Mancuso
Assistant Examiner—Joseph Colaianni
Attorney, Agent, or Firm—Antonelli, Terry, Stout & Kraus

[57] ABSTRACT

An image pickup apparatus for a television and a depth-of-field control apparatus used in the same. Image signals corresponding to a plurality of picture images different in focal point or length position are obtained by a mechanism for changing a focal point or length position to produce a new image signal by composing these image signals through a composition circuit, and motion information of an object is obtained by a circuit for detecting a moving portion in the object to control the image composition by the motion information. The focal point or length position is moved in synchronism with an integer multiple of a vertical scanning period of the television. The image signals corresponding to the plurality of picture images different in focal point or length position are obtained within one vertical scanning period determined by the system of the television. The amount of movement of the focal point or length position is controlled in conjunction with a value of a lens aperture of the camera lens. The image composition is controlled by a composition control circuit made up of a circuit for detecting individual powers of image signals corresponding to a plurality of different picture images, a circuit for comparing the detected powers with each other, and a circuit for detecting the position of an edge included in one of the image signals, wherein a control signal for the image composition produced by the power comparison circuit is compensated by the edge position information obtained by the edge detection circuit.

6 Claims, 15 Drawing Sheets

DEPTH-OF-FIELD CONTROL APPARATUS AND IMAGE PICKUP APPARATUS HAVING THE SAME THEREIN

BACKGROUND OF THE INVENTION

The present invention relates to a television camera apparatus or an image pickup apparatus and more particularly to a depth-of-field control apparatus and image pickup apparatus having the same therein for obtaining an image which is of great depth of field and is of high resolution.

In a television camera apparatus utilizing an image pickup tube, or a solid-state imaging device and a camera lens, the best focal length is obtained by adjusting a focus ring of a lens. At this time, a range in a direction of depth allowing an image to be taken or shot with a resolution substantially equal to that of the best focal length, i.e., a depth of field is determined by a lens aperture. More specifically, in a state in which the aperture of the lens is increased, the depth of field is shallow. In other words, the range allowing an image having a focal length near the best focal length to be obtained becomes narrow. Conversely, in a state in which the aperture of the lens is decreased, the depth of field becomes greater so that the range allowing a sharp image to be obtained is increased.

In a high definition television system which is anticipated as the next generation-television system, system design has been performed mainly for the purpose of providing an image of high resolution. It is also required for a television camera apparatus used for the high definition television system to have a high resolution property. In the meantime, since an image signal of high resolution is processed in the high definition television system, the band width of a signal processing circuit is about 30 MHz which is about 6 times as large as that of 4 to 6 MHz in the current television system. Accordingly, the noise band width is widened, and therefore, the power of noise mixed therein is increased. Then, the quantity of light made incident on the image pickup device is increased for the purpose of improving the signal to noise ratio (SNR). In the normal shooting in a studio or the like, the quantity of light for illumination is increased to realize the increase in the quantity of incident light. On the other hand, in the case where the quantity of light cannot be changed as in outdoor shooting, the aperture is increased to cope with such. Accordingly, in this case, the depth of field becomes shallow, so that the range allowing a sharp image to be obtained will be necessarily limited.

In the field of a microscope, a still-camera and the like, there has been well known a technique in which images located in a plurality of different focal lengths are composed to obtain a wide depth of field. For example, such a technique is disclosed in Takatoshi Ota et al: "A Method for Image Composition Using Image Variance", National Conference Record of the Institute of Electronics and Communication Engineer's of Japan, Vol. J66-D, No. Oct. 10, 1983, Satoshi A. Sugimoto et al: "Digital Composition of Images with Increased Depth of Focus Considering Depth Information", APPLIED OPTICS, Vol. 24, No. 14, Jul. 15, 1985, and the JP-A-1-309478. (Incidentally, JP-A-2-212809 (laid open on Aug. 24, 1990) which has not yet been yet laid open at the priority date of the present application also relates to the control of the depth of field).

SUMMARY OF THE INVENTION

Although, as described above, the aperture is increased to increase the quantity of incident light, thereby to improve the signal to noise ratio, the increase in aperture makes the depth of field shallow so that the range allowing an image of high resolution to be obtained becomes very narrow. For example, in the case of shooting a person, if the best focal length is set to the person, a background scenery thereof is completely out of focus, so that only an image which is of poor resolution as a whole will be obtained. Moreover, when the aperture is decreased, due to the diffraction phenomenon of light, an image of high resolution may not be necessarily obtained in some cases.

Even if an image of high resolution is obtained by composing the images located at a plurality of different focal lengths, as described above, for obtaining an image of high resolution irrespective of the degree of the lens aperture, there are various problems to be solved in order to apply such a method to a camera used for a television.

For example, in the case where an object including therein a moving portion is to be shot, it is found that if a plurality of images are simply added to each other, discontinuity occurs in the moving portion. Moreover, it is also necessary to determine the timing of shifting the focal point. Further, the speed of reading out an image for one field must also be adapted to the current television system. In addition thereto, there are various problems to be solved which will be shown in the paragraph of DESCRIPTION OF THE PREFERRED EMBODIMENTS.

It is therefore an object of the present invention to provide a camera or image pickup apparatus used for a television and a depth-of-field control apparatus therefor which are capable of providing a great depth of field and a high resolution irrespective of the degree of the lens aperture.

In order to attain the above object, according to one aspect of the present invention, there is provided a depth-of-field control apparatus used with an image pickup apparatus for a television provided with at least a camera lens and an image pickup device, the control apparatus comprising: means for changing a focal point or length of the camera lens; means for composing image signals; and means for obtaining motion information of an object from a signal outputted by the image pickup device, wherein a plurality of images different in focal point or length are obtained using the means for changing a focal point or length of the lens, a new image signal is obtained by composing those images, and image composition is controlled by the motion information of the object. The control of the image composition by the motion information is preferably carried out in such a way that when the motion of the object is detected, the means for changing the focal length of the lens is deactivated. This operation is based on an Applicants' finding that even if the increase in depth of field is stopped for an object having therein a moving portion, there is practically no problem.

According to another aspect of the present invention, the movement of the focal point or length is carried out in synchronism with an integer multiple of a period of vertical scanning of a television.

According to a further aspect of the present invention, the movement of the focal point or length of the lens is carried out in a blanking period during driving of the image pickup device.

BRIEF DESCRIPTION OF THE DRAWINGS

The foregoing and other objects, features and advantages of the invention will be apparent from the following more particular description of the preferred embodiments of the invention as illustrated in the accompanying drawings in which like reference numerals designates like or corresponding parts throughout figures, and wherein.

DESCRIPTION OF THE PREFERRED EMBODIMENTS

Figure 1:
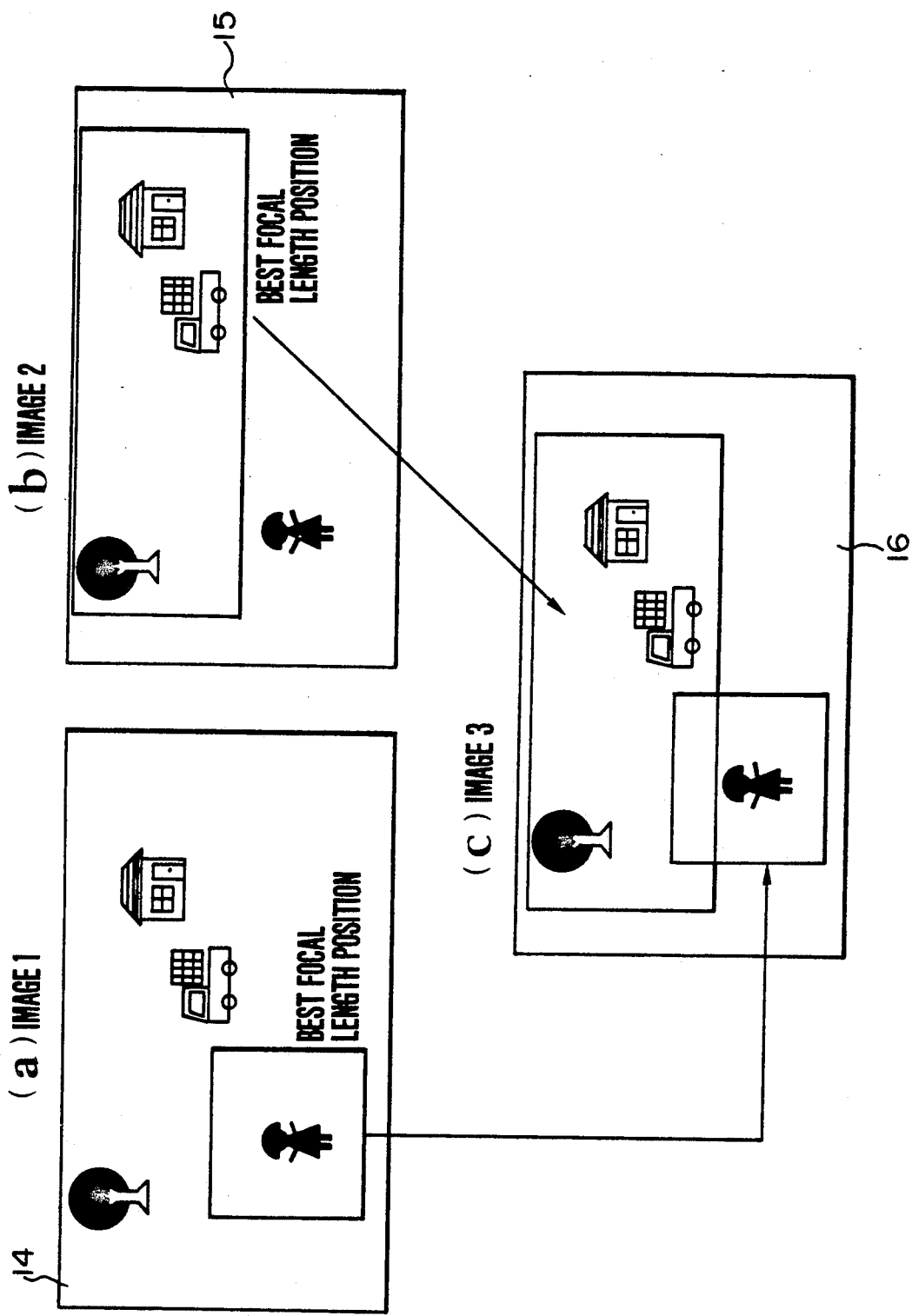
FIG. 1 is a diagram showing the concept of the present invention.

Preferred embodiments of the present invention will hereinafter be described in detail with reference to the accompanying drawings. First, description will be given with respect to the concept of the present invention referring to FIG. 1. FIG. 1(a) and (b) show respectively two sheets of picture images in which an image 1 and an image 2 are shot by changing the best focal length position with the same scene. In this scene, a person, and a building, a motor vehicle and a tree are shot in a near view and a distant view, respectively. The best focal length position in the image 1 is set to the person in the near view. As a result, in the image 1, the motor vehicle, the building and the tree in the distant view are out of focus, so that an image of poor resolution alone can be obtained. On the other hand, the best focal length position in the image 2 is set to the distant view, and therefore, an image alone in which the person in the near view is out of focus can be obtained. However, image portions set to the respective best focal length positions are selectively extracted from the two sheets of picture images to compose the extracted image portions, thus enabling a composite image which is in focus in both the near and distant views to be obtained. FIG. 1(c) shows a composite image 3 thus obtained. Since an image area having the best focal length position of the image 1 and an image area having the best focal length of the image 2 are used, the composite image 3 becomes an image which has a good focus condition in both the near and distant views and is of high resolution.

Figure 2:
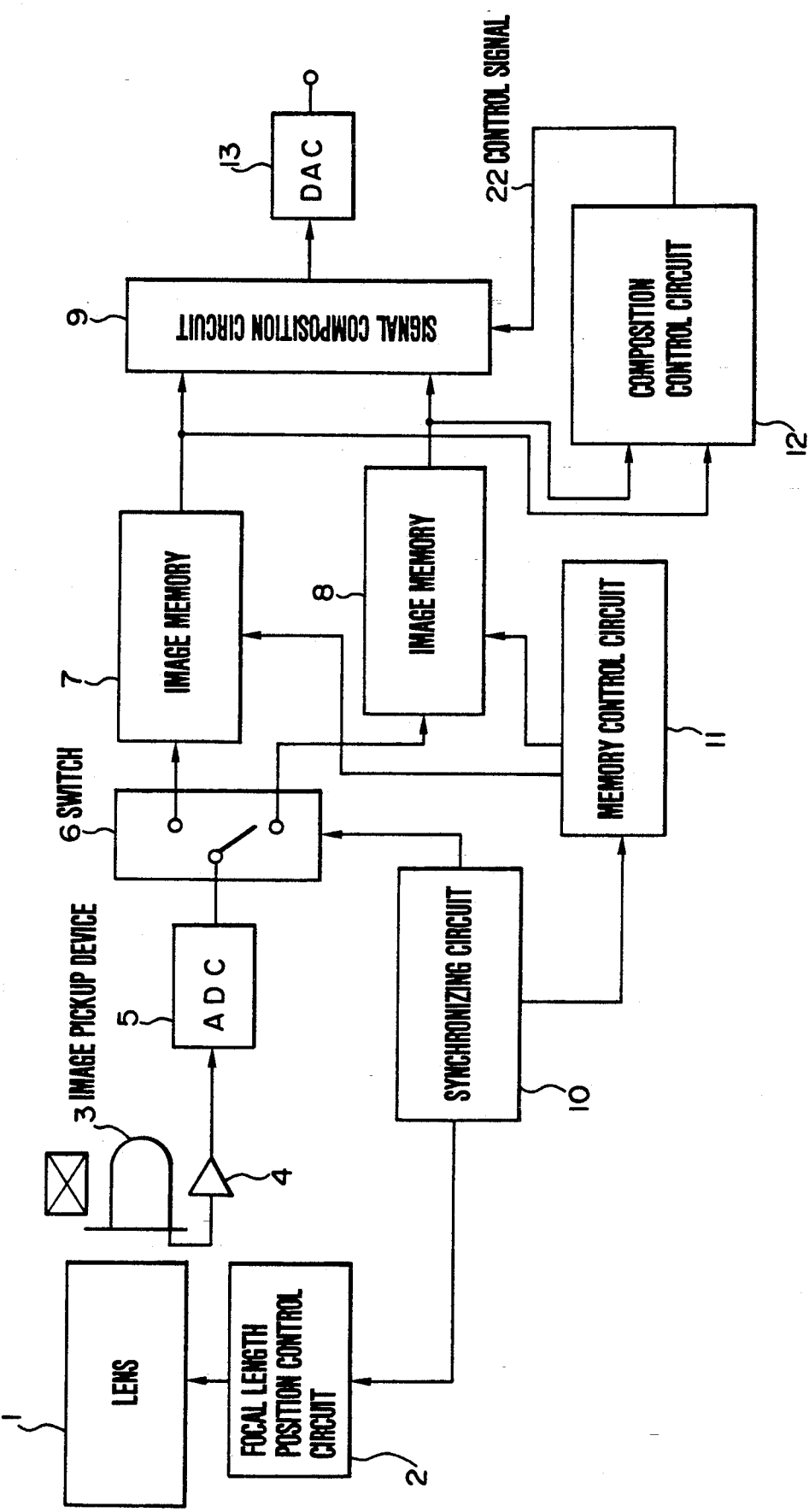
FIG. 2 is a block diagram showing one embodiment of a television camera according to the present invention.

FIG. 2 is a block diagram showing one embodiment of a television camera for realizing the above concept of the present invention. The present television camera comprises a camera lens 1 capable of controlling the best focal length position, a focal length position control circuit 2, an image pickup device 3, an analog-to-digital converter (hereinafter, referred to as simply "an ADC", when applicable) 5, a switch 6, image memories 7 and 8, a memory control circuit 11, a signal composition circuit 9, a digital-to-analog converter 13, a composition control circuit 12, and a synchronizing circuit 10. An image of an object is formed on a light receiving surface of the image pickup device 3 through the camera lens 1 and is converted into an electrical analog signal by the image pickup device 3. During the image pickup operation, the focal point or length position control circuit 2 exerts on the lens 1 so that the shooting is carried out with the best focal length position being switched to alternately a near view and a distant view. An analog amplifier 4 amplifies the electrical analog signal from the image pickup device 3 up to a predetermined amplification value and inputs the amplified analog signal into the ADC 5. The ADC 5 converts the analog signal into a digital signal. The digitized image signal is alternately written to the image memory 7 and image memory 8 by periodically switching the switching circuit 6 which is controlled by the synchronizing circuit 10. Incidentally, the write operation of the signal to the individual image memories is controlled by the memory control circuit 11. The image signals different in focal point or length position are stored in the image memory 7 and the image memory 8, respectively. Each of the signals which have been stored in the image memories 7 and 8 is inputted into both the signal composition circuit 9 and the composition control circuit 12. The signal composition circuit 9 selects one of the image signals inputted thereto through the two lines or systems near the respective best focal point or length positions and composes the selected image signals for one sheet of picture image. The composition control circuit 12 judges which is set to the best focal length out of the image signals inputted thereto through the two lines or systems and sends a control signal used for selecting an image set to the best focal length to the signal composition circuit 9. Incidentally, the synchronizing circuit is used for synchronizing the focal length position control circuit 2, the memory control circuit 11 and the switching circuit 6.

FIGS. 3(a) and 3(b) are timing charts useful for explaining one example of operation of the television camera shown in FIG. 2. With the camera shown in FIG. 2, it has been described that the shooting is carried out in such a way as to switch the focal point or length condition alternately to a near view and a distant view. FIGS. 3(a) and 3(b) show the switching timing therefor. According to the present timing, in the period of a first field, shooting is carried out under a focal length condition 1 (e.g., corresponding to a near view), and in the period of a second field, shooting is carried out under a focal length condition 2 (e.g., corresponding to a distant view). The change of the focal length position may be performed in a vertical blanking period (V-BL period). Of course, although the change of the focal length position may be performed in a video period, this change operation is preferably performed in the vertical blanking period (V-BL period) upon which there is no influence of noise or the like generated during the change of the focal length position. Incidentally, after a third field, shooting is continued while changing the focal length conditions 1 and 2 alternately again.

Figure 3:
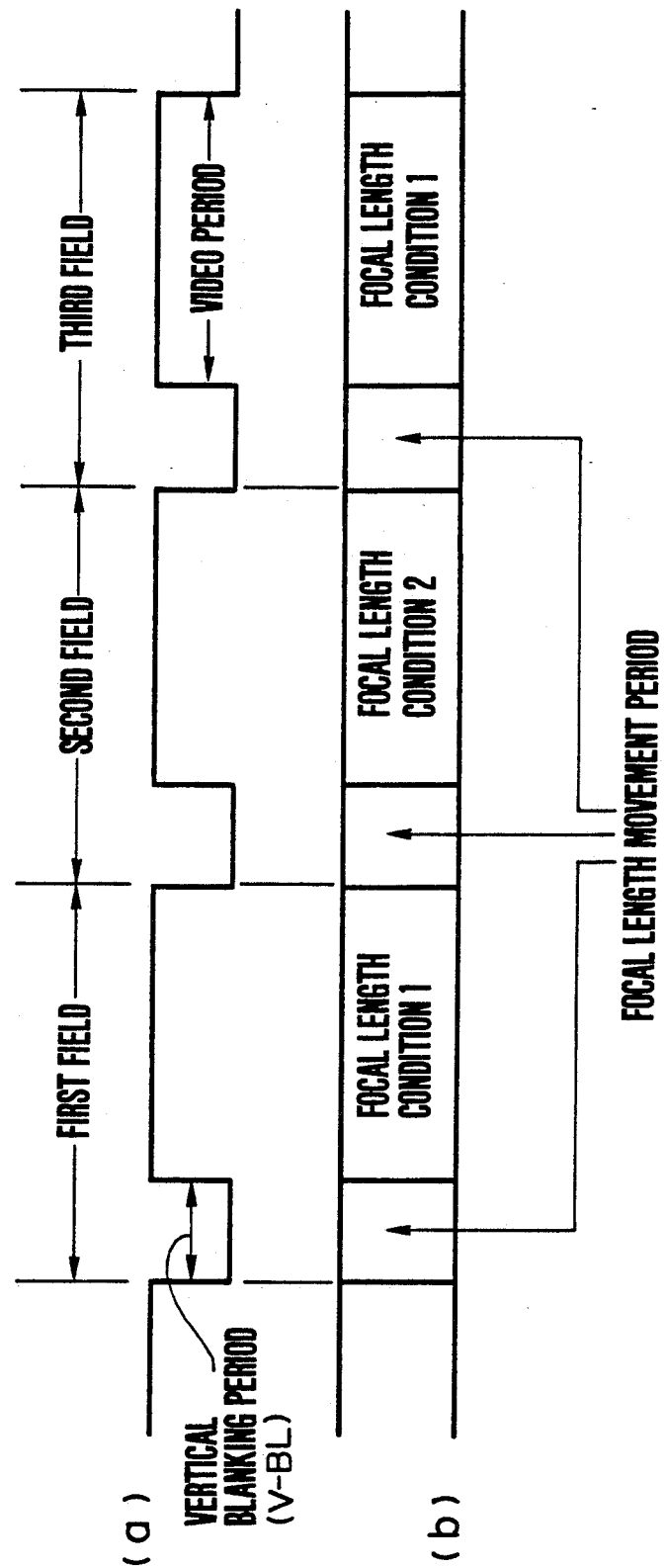
FIG. 3, FIG. 4 and FIG. 5 are timing charts showing the image pickup operation.

FIGS. 4(a) and 4(b) are timing charts showing a modification of the example shown in FIG. 3. In these figures, three kinds of focal length conditions are provided. The details of these three kinds of focal length conditions correspond to a distant view, a middle view, and a near view, respectively, for example. That is, there is shown a timing at which images different in focal point or length position are successively inputted into the three fields and one sheet of picture image having a great depth of field is obtained by composing these three kinds of images. In this case, as a matter of course, the memory for storing therein the image signals corresponding to the respective focal length conditions is provided with three fields. The point is that images different in focal length condition are taken, and image portions in focus are selected from these images to be composed so that a composite image which has a great depth of field and is of high resolution may be obtained. Therefore, the number of the focal length positions can be set freely.

FIGS. 5(a) and 5(b) are timing charts showing another modification of the example shown in FIG. 3. According to the present modification, the timing of the double speed operation is provided in which the image signals of the two fields are read out in one vertical scanning period (16.6 ms in the high vision system). When one sheet of picture image is obtained by composing the images taken in the period of the two fields, as shown in FIG. 3, the field frequency becomes one half. Therefore, the images are previously read out at a double field frequency, and the normal field frequency is finally secured. Since the image signals are read out at the double field frequency, the band width of noise is increased and the quantity of signals is decreased to reduce the sensitivity so that it will be necessary to increase the lens aperture. According to the present system, however, since the depth of field can be controlled irrespective of the increase or decrease in the lens aperture, a depth more than wide enough to compensate for the decrease in the depth of field due to the increase in the lens aperture can be obtained. As a result, there is practically no problem when the signals are read out at the double speed.

Figure 6:
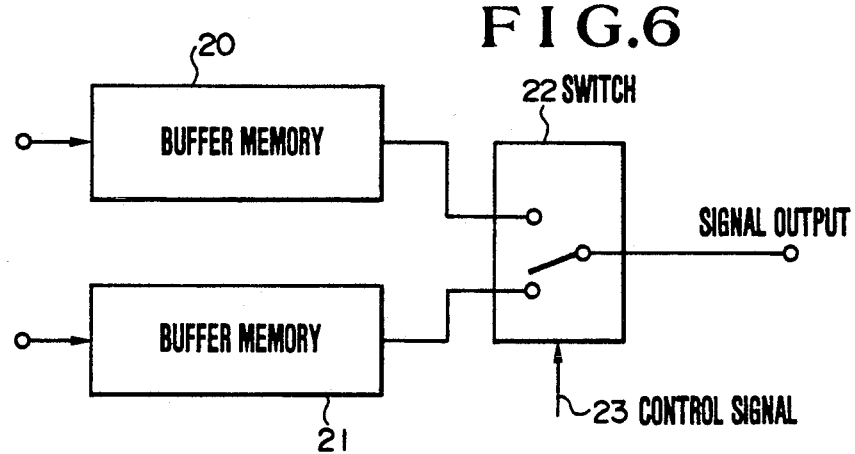
FIG. 6, FIG. 7, FIG. 8 and FIG. 9 are respectively block digrams showing examples of a signal composition circuit.

FIG. 6 is a block diagram showing an embodiment of the signal composition circuit 9. This circuit is made up of buffer memories 20 and 21, and a selection circuit 22. The image signals read out from the image memories 7 and 8 shown in FIG. 1 are temporarily stored in the buffer memories 20 and 21, respectively, and are then inputted into the selection circuit 22. The selection circuit 22 controls to select which signal stored in either the buffer memory 20 or buffer memory 21 to be outputted by receiving an instruction of a control signal 23. More specifically, the selection circuit 22 selects the image signal, from which an image nearer the focusing state is obtained, read out from the memory. In this regard, the function of each buffer memory will be described later.

Figure 7:
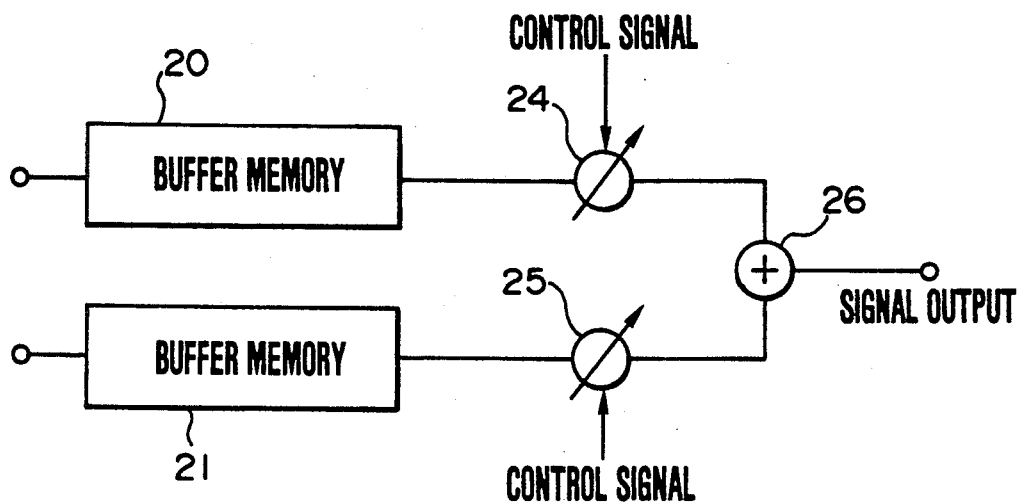

FIG. 7 is a block diagram showing a modification of the embodiment shown in FIG. 6. In the modified embodiment as shown in FIG. 6, an on/off control has been carried out by the selection circuit 22. In contrast thereto, in the present modification, a control system using gain control circuits 24 and 25, and an adder 26 is operated. The output signals from the buffer memories 20 and 21 are respectively applied to the gain control circuits 24 and 25 which adjust the respective gains, and are then inputted to the adder 26. According to this circuit system, there are provided an effect in that since the gains are smoothly changed when two sheets of picture images are composed, the picture quality of a boundary portion of the composite image is continuously changed to eliminate distortion of the boundary portion, and another effect in that any depth of field can be set freely irrespective of the state of increase or decrease of the lens aperture.

Figure 8:
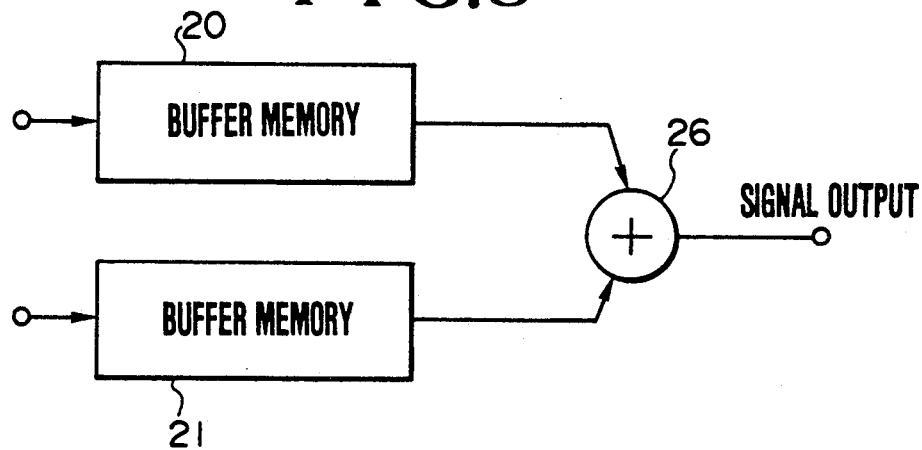

FIG. 8 is a block diagram showing an embodiment of a simplified circuit of the circuit system shown in FIG. 6 or FIG. 7. In this circuit, the gain control circuits are eliminated, and image signals corresponding to two sheets of picture images are simply added to each other by the adder 26. According to such a system, an image signal corresponding to an image area which is in focus is added to an image signal corresponding to an image area which is out of focus. As a result, there is an effect in that high resolution information (high frequency region) is obtained from the image in the focusing state, and therefore, simple addition allows an image signal of higher resolution than the state normally out of focus to be obtained.

Figure 9:
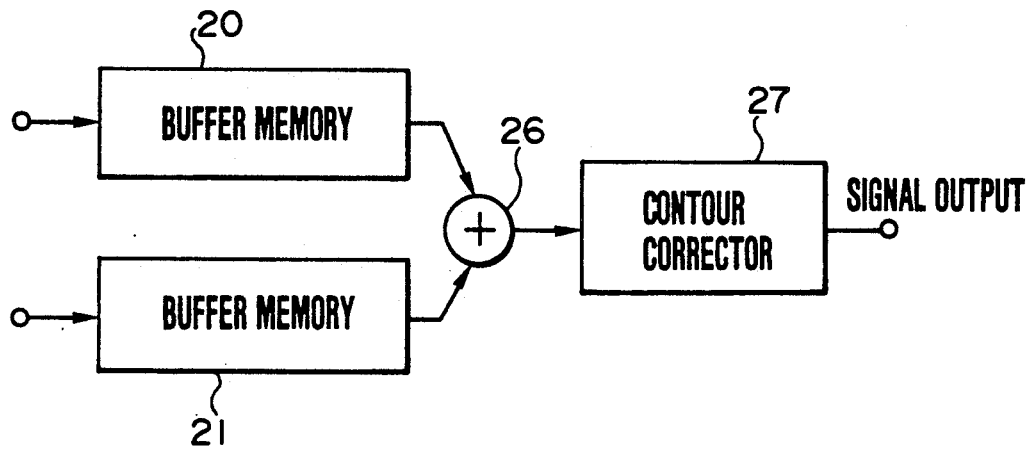

FIG. 9 is a block diagram showing an embodiment of a signal composition circuit in which a contour corrector 27 is added to the embodiment of FIG. 8. A simply adding operation results in that a high frequency signal is added. In the present embodiment, however, an enhancement of a high frequency region is further performed by the contour corrector 27, thus enabling an image signal corresponding to an image of high resolution to be obtained. Incidentally, in the above-mentioned embodiments, description has been given with respect to the system for selecting an image in the focusing state, or performing the simply adding operation. However, alternatively, as another image signal processing technique, a method of displaying a plurality of picture images different in focal point or length position alternately may be employed. In this case, if image signals corresponding to a plurality of picture images are displayed through a contour enhancement circuit, it is possible to obtain an image of higher resolution. According to the present embodiment, there is an effect substantially similar to that of FIG. 8 in that a human eye has an integral function (i.e., the function of recognizing a plurality of picture images displayed in a short time as an added image) as visual characteristics, and therefore, the images alternately displayed are recognized as an image of high resolution.

Figure 10:
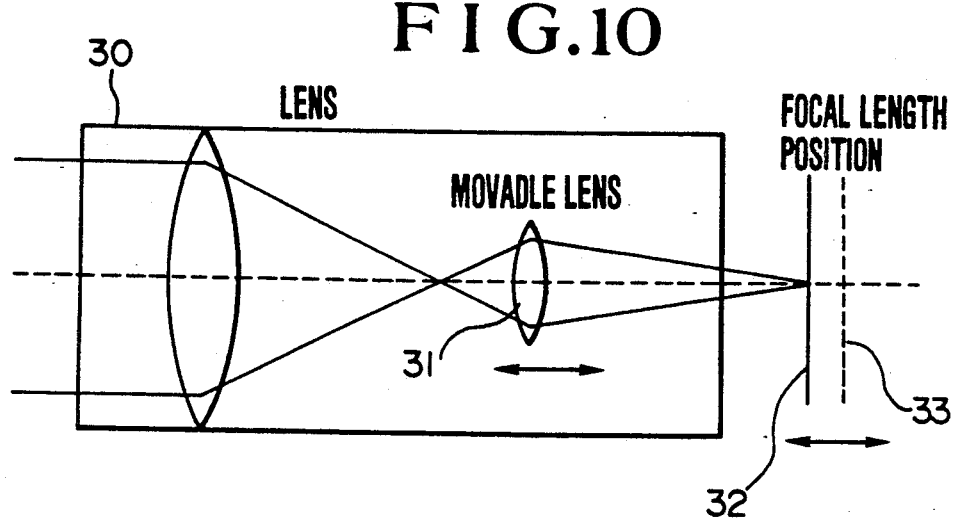
FIG. 10 and FIGS. 11A and 11B are respectively block diagrams showing examples of arrangement of a camera lens each of which is capable of changing a focal point length.

FIG. 10, FIG. 11, FIG. 12 and FIG. 13 are respectively block diagrams showing embodiments each having therein means for changing the best focal length position. FIG. 10 shows an embodiment in which the best focal length position is controlled by moving a movable lens 31. A camera lens used for a television camera is formed by a plurality of lenses a part of which is moved to change the best focal point or length position 32 to a focal point or length position 33. In the present embodiment, the position of the movable lens 31 is changed at a frequency equal to or more than a field period (60 Hz), and therefore, it is preferable to drive a lens with a less weight. Moreover, it is needless to say that it is preferable to change a focal point or length position with a method of providing the least variations in magnification of an image to be taken and the least occurrence of image distortion by moving a lens. As a method of driving the movable lens 31, there is considered a method of utilizing a piezoelectric element, or a method of mechanically driving the lens by a motor.

Figure 11A:
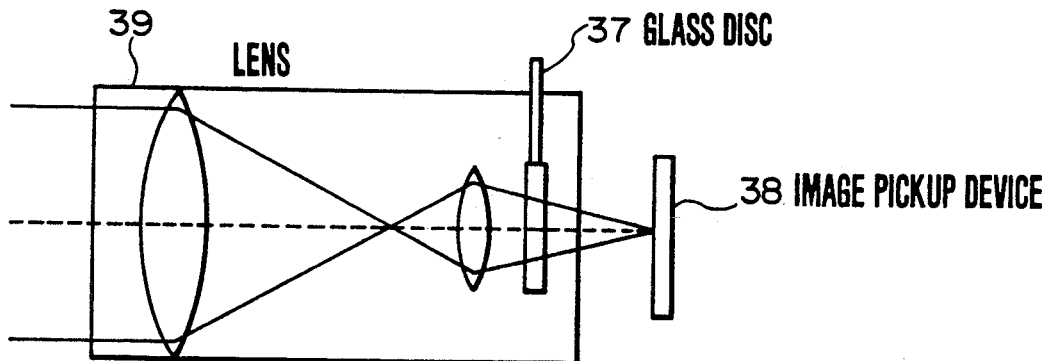
Figure 11B:
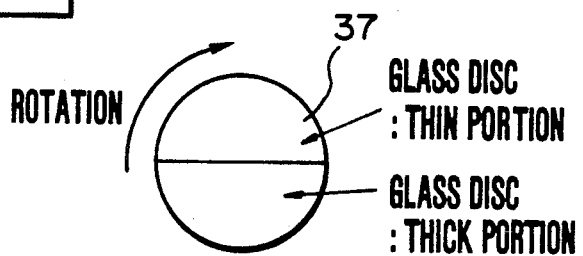

FIGS. 11A and 11B show another embodiment for changing a focal point or length position. In the present embodiment, a disc-like glass plate 37 which has different thicknesses in position (i.e., stepped shape in cross section) is rotated. This glass disc 37 is inserted between a lens 39 and an image pickup device 38. A change in the thickness of the glass allows the control of the focal length position to be carried out. For the rotation of the glass disc 37, a motor can be utilized. By rotating, the glass disc 37 in synchronism with the reading out of an image signal from the image pickup device 38, two sheets of picture images different in focal length position can be obtained. In this regard, although the glass having two kinds of thicknesses is utilized in the present embodiment, the kind of thickness of the glass is not necessarily limited thereto. That is, it is readily understood that a glass disc having three or more kinds of thicknesses may be used.

Moreover, instead of the above-mentioned glass disc, a crystalline plate may be used. This crystalline plate is produced by forming transparent electrodes on both sides of a plate member made of ferroelectrics such as gadolinium molybdate. The refractive index of the crystalline plate thus produced can be controlled by applying a suitable voltage across the crystalline plate. Therefore, if, instead of the glass disc 37, the crystalline plate is arranged, the focal length position can be changed using no movable portion.

Figure 12:
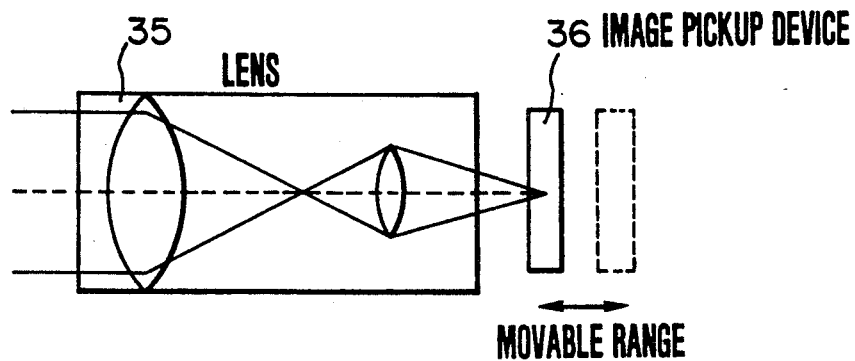
FIG. 12 and FIG. 13 are respectively block diagrams showing examples of arrangement of an image pickup system each of which is capable of changing a focal point or length.

Now, in FIG. 2, description was given with respect to the specific embodiment in which the focal length position control circuit 2 exerts control on the camera lens. In the meantime, FIG. 12 shows an embodiment in which the position of an image pickup device 36 is changed with no movement of a lens 35 to change the best focal length position. In the present embodiment, the focal length position control circuit 2 exerts control on the image pickup device 36 to change the position of the image pickup device, so that the best focal length position can be controlled in such a way as to be set to either a near view or a distant view. It is considered that the position of the image pickup device 36 is changed by driving a piezoelectric element or a motor in the same manner as in the embodiment shown in FIG. 10.

Figure 13:
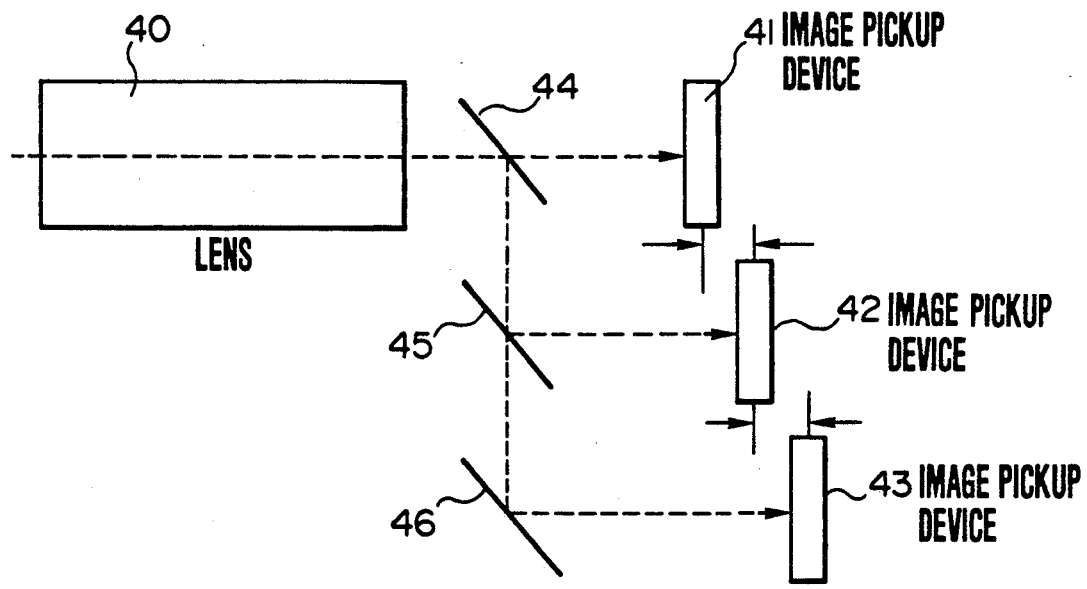

FIG. 13 shows an embodiment in which the embodiment shown in FIG. 11 is applied to a multiple solid-state imager, or multitube type camera. In the embodiment shown in FIG. 12, as already described above, the position of one image pickup device 36 is vibrated mechanically. But, in the present embodiment shown in FIG. 13, three image pickup devices 41, 42 and 43 are mounted on an optical axis of a lens 40 at phase differences of a predetermined value. On the individual image pickup devices are formed the same image of an object through half mirrors 44, 45 and 46, respectively. In this connection, the image pickup devices 41, 42 and 43 are placed in positions in which their best focal length positions are set to a near view, a middle view, and a distant view, respectively. By selecting an image signal corresponding to an image in a good focusing state from image signals obtained from the individual image pickup devices, a sharp image having a great depth of field can be obtained. In this regard, the present embodiment is suitable for a color television camera. More specifically, a color camera provided with a plurality of image pickup devices may be constructed in such a way that the half mirrors 44, 45 and 46 are replaced with a dichroic mirror, and image pickup devices provided for individual color channels are arranged in a manner as shown in FIG. 13. Out of image signals obtained from a color camera, a luminance signal for which high resolution characteristics are required is a composite signal of the individual color signals, and therefore, the present embodiment in which a composite image signal of the image signals from the individual image pickup devices has a high resolution is suitable for the color camera. Moreover, the present embodiment is also suitable for a color image pickup system which is referred to as a dual green system. The dual green system is such a system that three image pickup devices are prepared, and of them, two image pickup devices are used for a green signal and the remaining one is used for a red signal and a blue signal. Since the two image pickup devices are used for the green signal which has the highest ratio among the original colors forming the luminance signal, it is especially effective for increasing the depth of field of the luminance signal to arrange the two image pickup devices with phase differences being kept. In this regard, it will be readily understood that the number of image pickup devices may be set arbitrarily as long as they are arranged with phase differences being kept, which is in the scope of the present invention.

Figure 14:
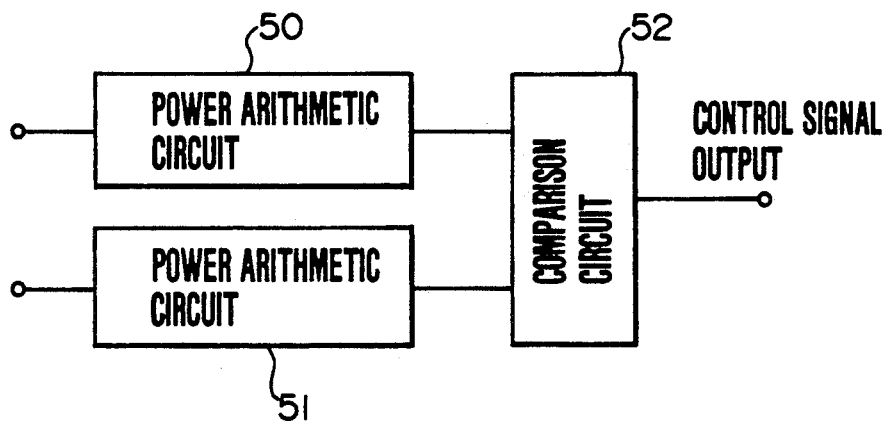
FIG. 14 and FIG. 16 are respectively block diagrams showing examples of a composition control circuit.
Figure 15:
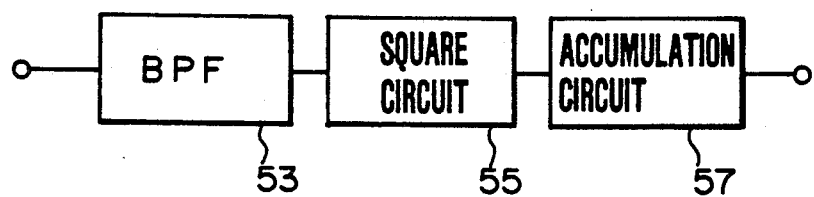
FIG. 15 is a block diagram showing one example of a power arithmetic circuit.

The composition control circuit 12 shown in FIG. 2 will be described in detail. The composition control circuit 12 of FIG. 2 serves to judge which signal temporarily stored in either the image memory 7 or the image memory 8 is in a focusing state and to generate the control signal 22 for selecting an image signal in the focusing state. FIG. 14 is a block diagram showing an embodiment of a focusing state judgment circuit suitable for the selection circuit 22 shown in FIG. 6. The present circuit is made up of signal power arithmetic circuits 50 and 51, and a comparison circuit 52. An image in a focusing state includes therein many high frequency signal components, so that a high frequency power becomes large. Therefore, by comparing two high frequency powers with each other, it is possible to readily judge which signal is in a focusing state. FIG. 15 is a block diagram showing an embodiment of the power arithmetic circuit 50. The present circuit is made up of a band pass filter (hereinafter, referred to as simply "a BPF", when applicable) 53, a square circuit 55, and an accumulation circuit 57. The BPF 53 serves to selectively pass therethrough an intermediate frequency signal of an image signal. The power of an image signal can be calculated by means of the square circuit 55 and the accumulation circuit 57. In this regard, even if an absolute circuit is used instead of the square circuit, the power of an image can be calculated, and therefore, such replacement is available. The judgment of the power of an image signal needs to be performed prior to the operation of the signal composition circuit 9 shown in FIG. 1. The buffer memories 20 and 21 incorporated in the selection circuit as described in the embodiments of FIG. 6, FIG. 7, FIG. 8 and FIG. 9 are used for signal delay of a period required for the composition control circuit to generate the control signal.

Figure 16:
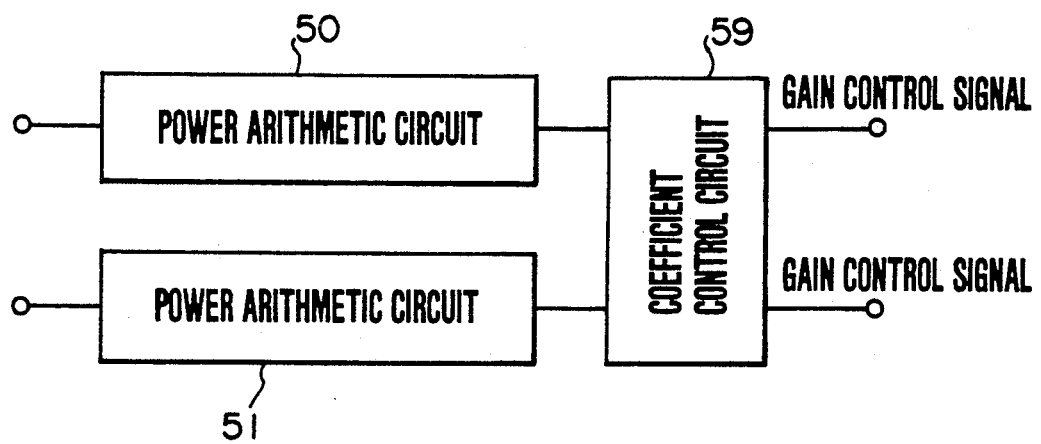

FIG. 16 is a block diagram showing an embodiment of the composition control circuit suitable for the signal composition circuit shown in FIG. 7. The present circuit employs a coefficient control circuit 59. The coefficient control circuit 59 serves to generate a coefficient signal depending on the arithmetic results of the power arithmetic circuits 50 and 51. For example, in the case where the power of an image signal stored in the image memory 7 of FIG. 2 is larger than that of an image signal stored in the image memory 8, the gain of the gain control circuit 24 is set larger than that of the gain control circuit 25. The gain control characteristics may be set in such a way that the boundary portion of a used image is smoothly changed.

Now, the description will be given with respect to another example of the composition control circuit shown in FIG. 14. The present embodiment has a function of compensating an error on selection of a near view and a distant view.

The composition control circuit shown in FIG. 14 compares the powers of the inputted high frequency signals of two sheets of picture images with each other and outputs the control signal for selecting a near view and a distant view. Then, the noise is contained in the image signal outputted by the image pickup device. Therefore, in the selection circuit for judging the focusing state on the basis of the comparison result of the magnitudes of the high frequency signals, there may be an error on selection of a near view and a distant view due to the mixed noise in some cases.

Figure 17:
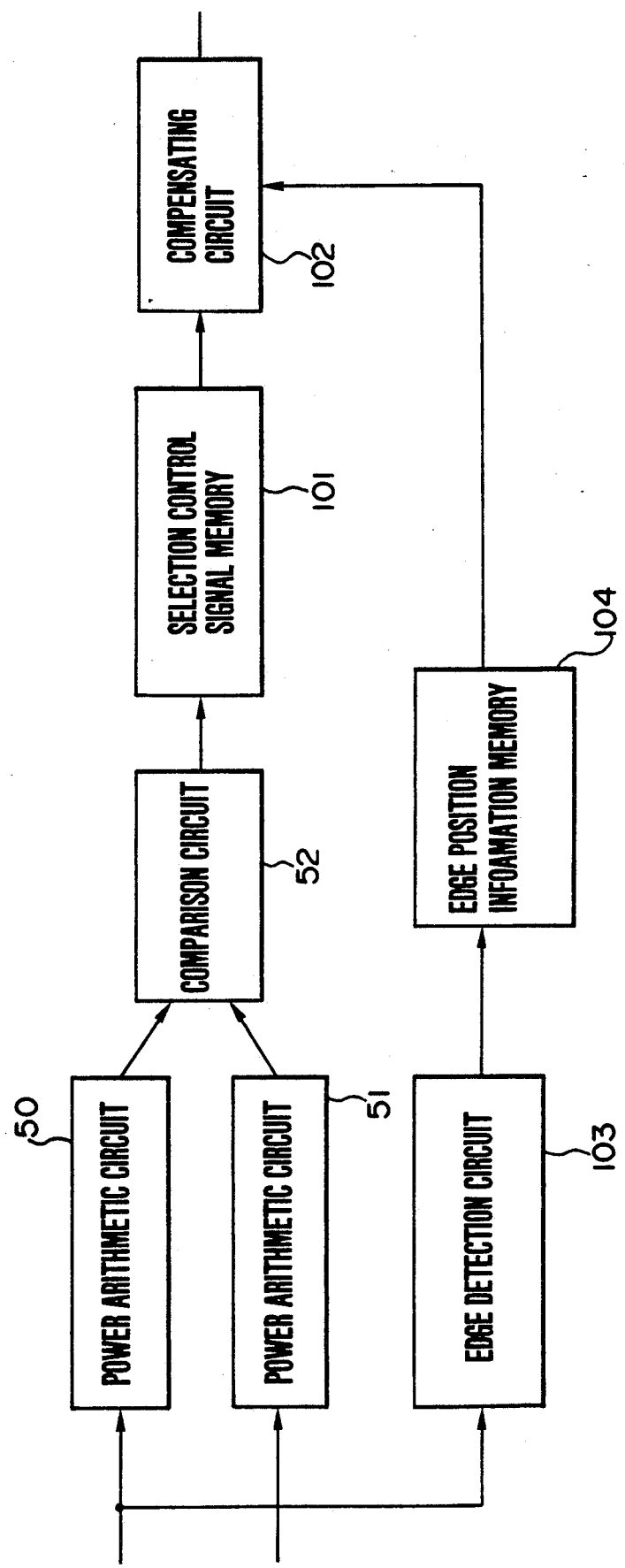
FIG. 17 and FIG. 18 are respectively a block diagram showing another example of the composition control circuit as shown in FIG. 14, and a diagram useful in explaining the operation of the composition control circuit shown in FIG. 17.

FIG. 17 is a block diagram showing an embodiment of a circuit for compensating the mistaken selection result. In the present embodiment, a boundary signal contained in an image signal, i.e., information about an edge position is used to compensate the selection result. The procedure is based on the Applicant's knowledge that in a general image, an edge signal is present at the boundary portion of an object, and an area surrounded by the edge belongs to the same object in many cases.

In the circuit of the present embodiment shown in FIG. 17, an edge detection circuit 103, a selection control signal memory 101, an edge position information memory 104, and a compensating circuit 102 are added to the composition control circuit shown in FIG. 14. The description will subsequently be given with respect to a method of compensating a selection control signal using edge position information, with reference to FIG. 18.

Figure 18:
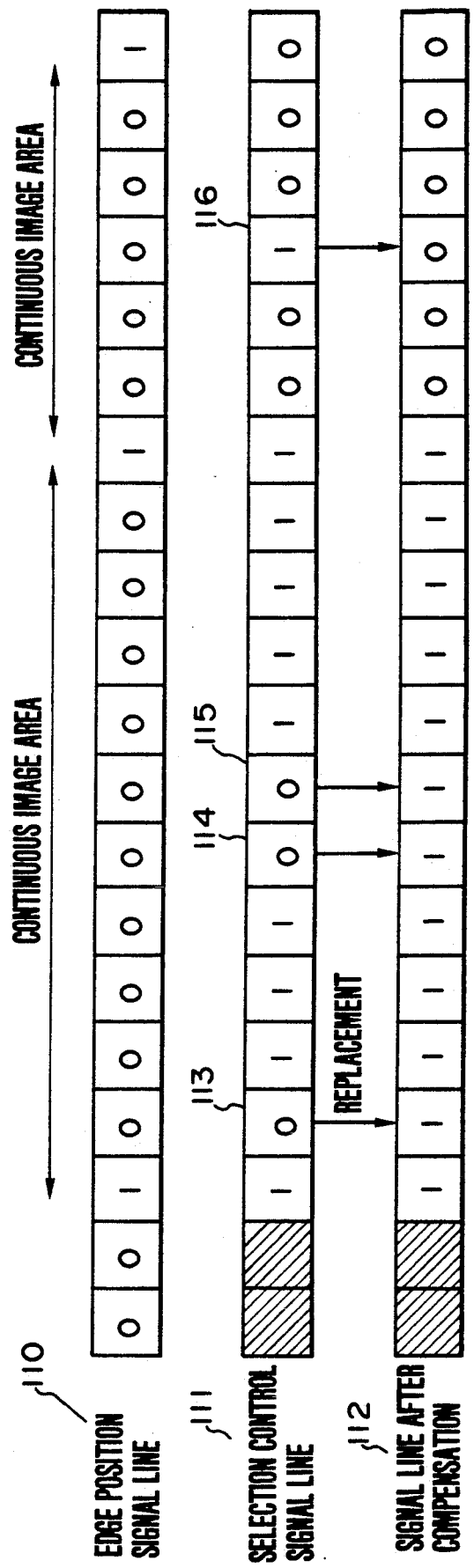

FIG. 18 is a diagram showing parts of output data of the edge detection circuit 103, the comparison circuit 52 and the compensating circuit 102 of FIG. 17 which are taken out in a direction of the vertical scanning line. The output of the edge detection circuit 103 is shown by an edge position signal line 110; the output of the comparison circuit 52 is shown by a selection control signal line 111; and the output of the compensating circuit 102 is shown by a signal line 112 after compensation. Incidentally, a position where the edge is present and that where the edge is absent are digitally represented by "1" and "0", respectively. Moreover, with the output of the comparison circuit 52, the judgment of a near view image and that of a distant view image are digitally represented by "0" and "1", respectively. As shown in FIG. 18, with coded areas in the selection control signal line 111 corresponding to continuous coded image areas in the line 110 surrounded by the two edge signals, the selection control signal line 111 is inspected. More specifically, in the coded areas in the line 111 corresponding to the continuous coded image areas in the line 110, the number of selection of near views ("0") and that of selection of distant views ("1") are individually counted. Then, all the digitized codes of the selection results with less counts (e.g., "0") are replaced with the digitized codes of the selection results with larger counts (e.g., "1"). In this regard, there is provided the selection control signal memory 101 for temporarily storing therein the selection control signal used for that replacement. In the example of FIG. 18, the data replacement is carried out in the data positions 113, 114, 115 and 116, so that the coded data in the line 111 corresponding to the continuous coded data in the line 110 surrounded by the edge signal are made to be identical with each other. As set forth hereinabove, according to the present embodiment, the information about the boundary of an object is taken out by the edge signal of an image and the image areas combined by the boundary is judged to belong to the same image, whereby it is possible to prevent an error on selection of a near view and a distant view due to the mixed noise.

Figure 19:
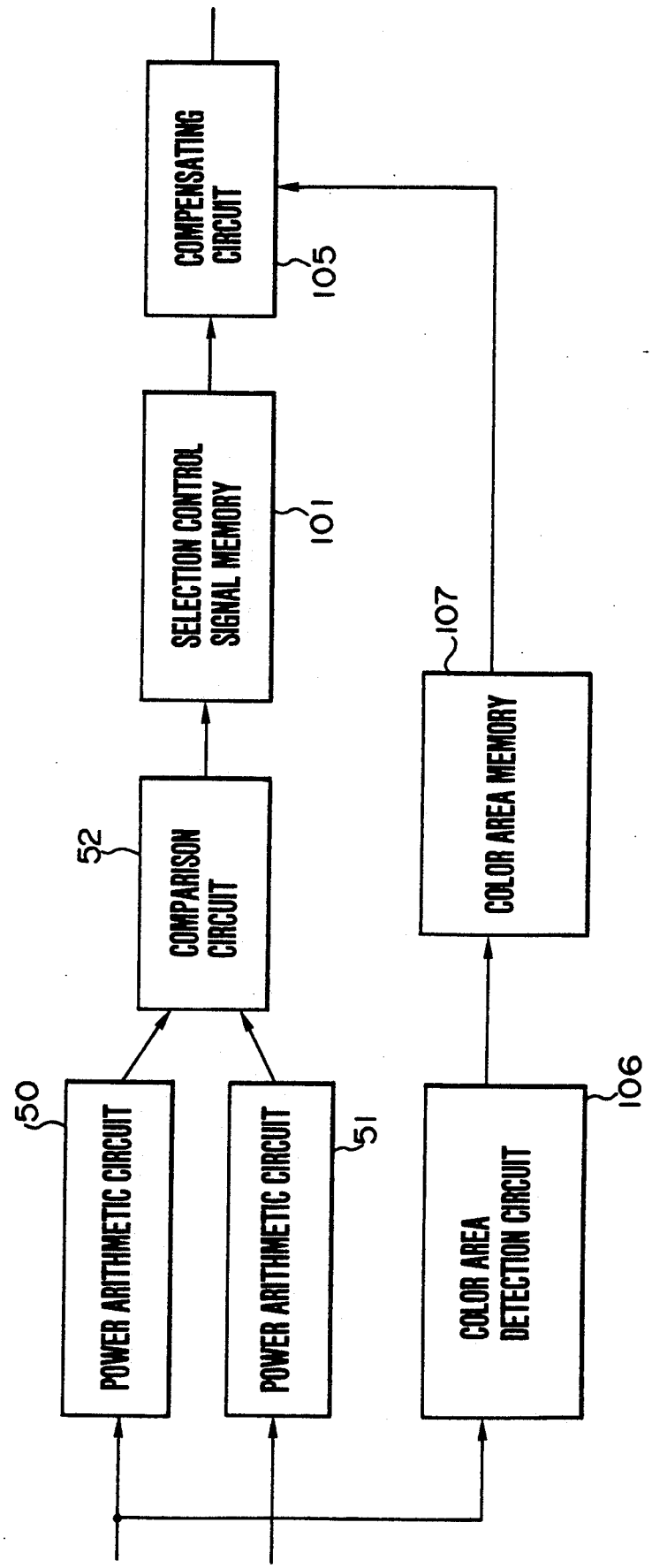
FIG. 19 and FIG. 20 are respectively block diagrams showing further examples of the composition control circuit as shown in FIG. 14.

In order to judge whether or not image areas combined by the boundary belong to the same object as described above, color information of an image signal is also utilized. That is, in this case, such a judgment procedure is based on the information that the same object is formed by a similar color in many cases. FIG. 19 is a block diagram showing an embodiment of a circuit for compensating the selection signal with color information. In the present embodiment, the edge signal detection circuit 103, and the edge position memory 104 both shown in FIG. 17 are replaced with a color area detection circuit 106 for detecting an area having the same color, and a color area memory 107, respectively. In the embodiment shown in FIG. 19, an image area formed by the same color is detected by the color area detection circuit 106, and the result of detection is stored in the color area detection memory 107. In a similar way to the compensation by the edge, the number of near views and that of distant views within an image area surrounded by the same color are individually counted, and all the codes of the selection result with less counts are replaced with the codes of the selection result with larger counts.

Figure 21:
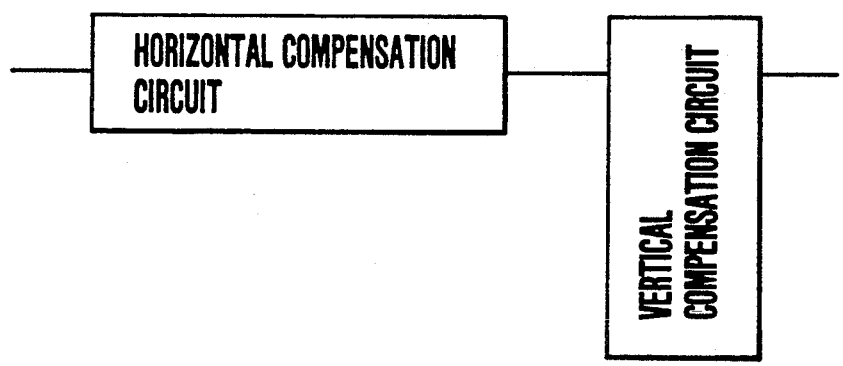
FIG. 21 is a block diagram showing one example of a method of performing a compensating operation of the composition control circuit shown in FIG. 17, FIG. 19 or FIG. 20 in a two dimensional manner.
Figure 20:
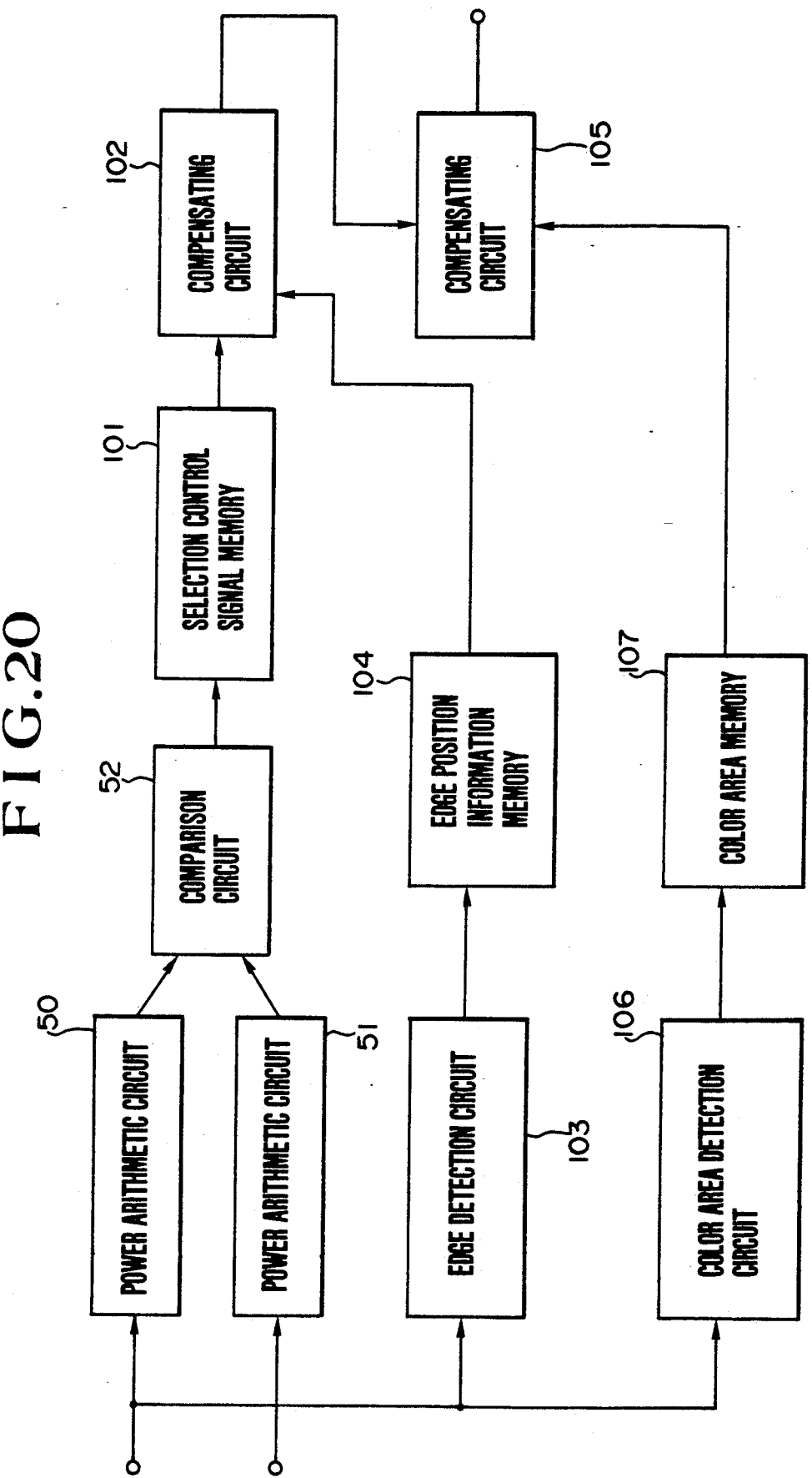

FIG. 20 is a block diagram showing an embodiment of a circuit in which the examples of FIG. 17 and FIG. 19 are combined and compensation is carried out in two steps. Incidentally, in the present embodiment, after the compensation by the edge is performed, the compensation by the color information is performed. However, the order of the compensations may be reversed. Moreover, in the above description with respect to the compensation, a compensating method by one dimensional signal processing has been described. However, it is readily understood that such a signal processing may be expanded to two dimensional one. In this case, such a procedure may be taken that an image area is divided by either the edge signal or a color area, and in each of the divided image areas, the number of selection of near views and that of selection of distant views are individually counted. Further, even in the case of one dimensional compensating processing, as shown in FIG. 21, even if a vertical one dimensional compensation is performed after the completion of a horizontal one dimensional compensation, there is the same effect as in the two dimensional compensation.

Figure 22:
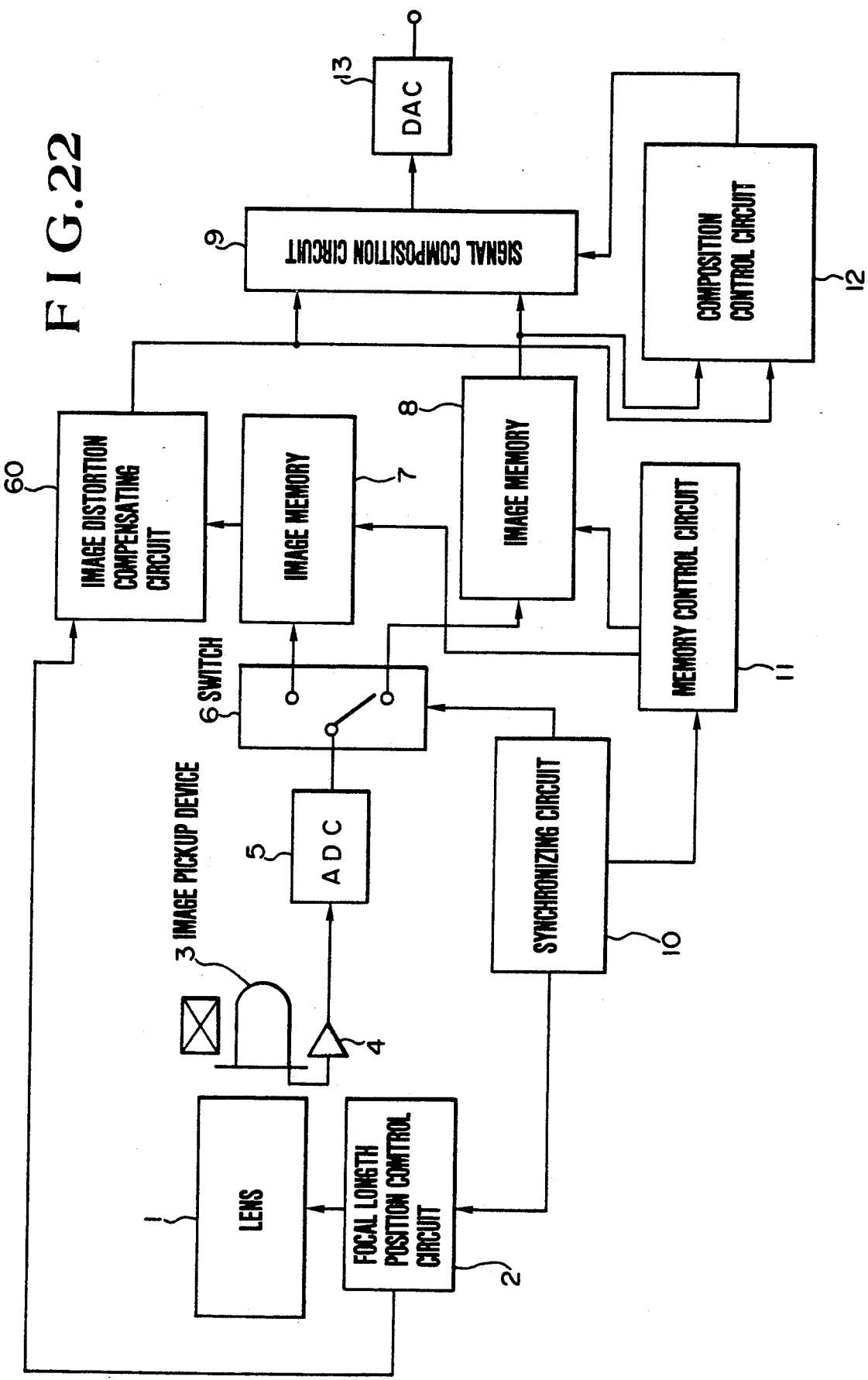
FIG. 22 is a block diagram showing another embodiment of the television camera according to the present invention, which is constructed by adding an image distortion compensating circuit to the television camera shown in FIG. 2.
Figure 23:
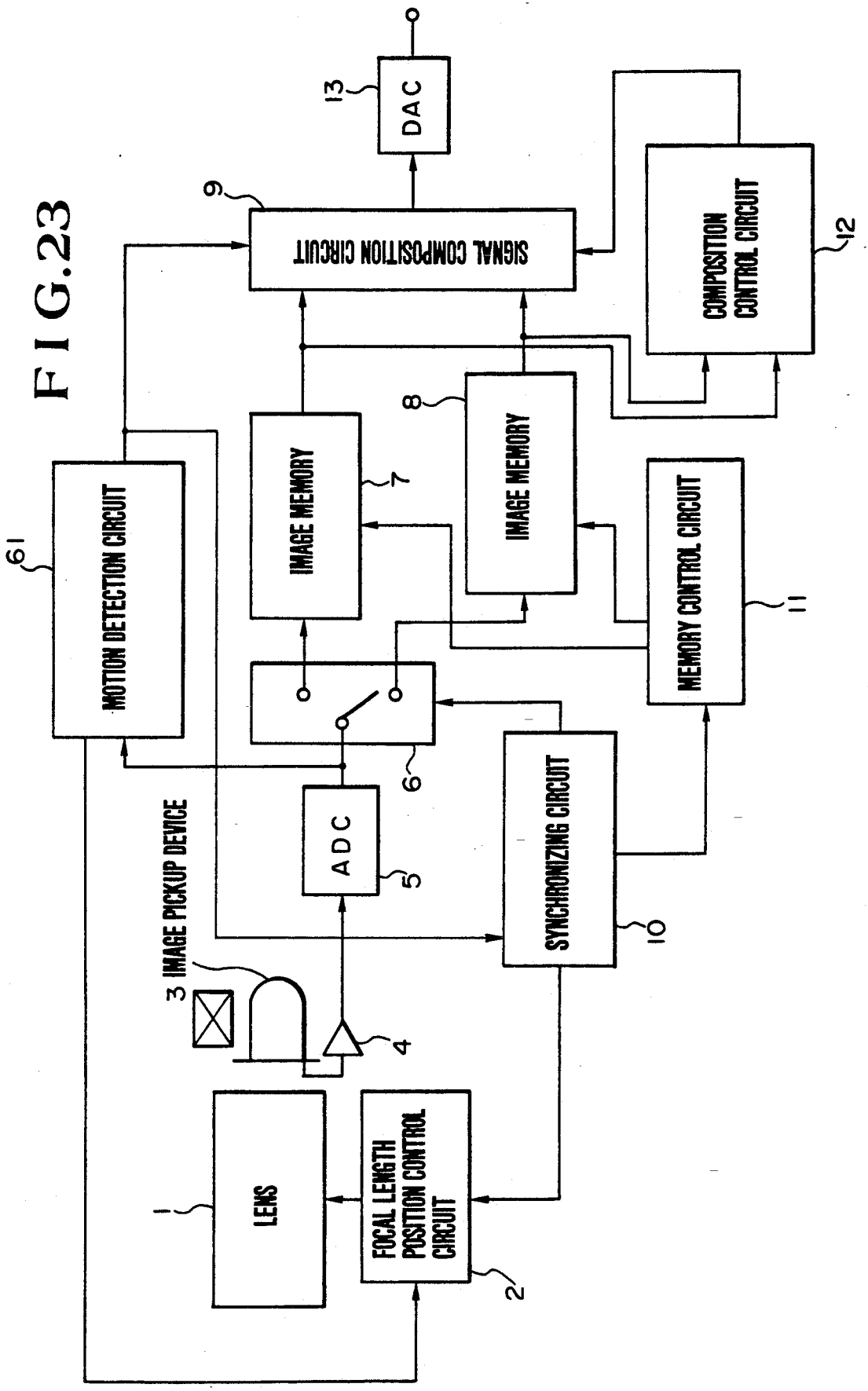
FIG. 23 is a block diagram showing a further embodiment of the television camera according to the present invention, which is constructed by adding a motion detection circuit to the television camera shown in FIG. 2.

FIG. 22 and FIG. 23 are respectively block diagrams showing modified embodiments of the embodiment shown in FIG. 1. The embodiment of FIG. 22 is different in arrangement from the embodiment of FIG. 2 in the additional provision of an image distortion compensating circuit 60. With a normal lens, when the focal length position is changed, following this, the magnification of an image is changed. The image distortion compensating circuit 60 has a function of compensating distortion of an image due to the change of the focal length position. For a method of compensating the image distortion, a geometric image compensating method such as an affine transformation which has been developed in the field of a digital image processing may be employed. The distortion of an image which is generated during the change of the focal length position mainly results in the change of the magnification of an image, and therefore, such a distortion compensating circuit is not necessarily used. For example, alternatively, such a construction may be taken that a zoom lens is used as a camera lens, and the zoom magnification is controlled in synchronism with the drive of a focal lens to prevent the change of the image magnification.

Figure 4:
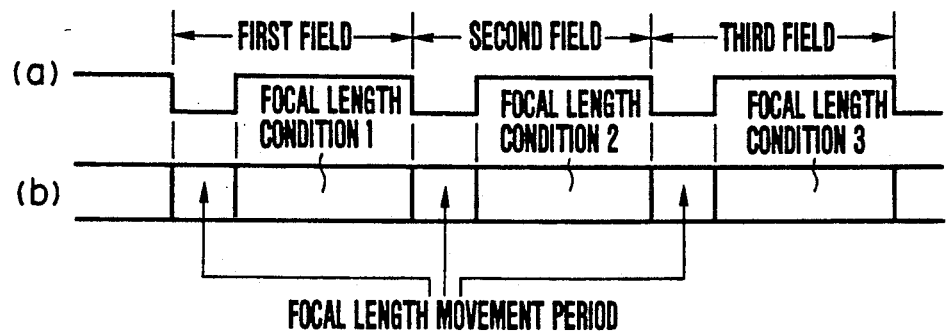
Figure 5:
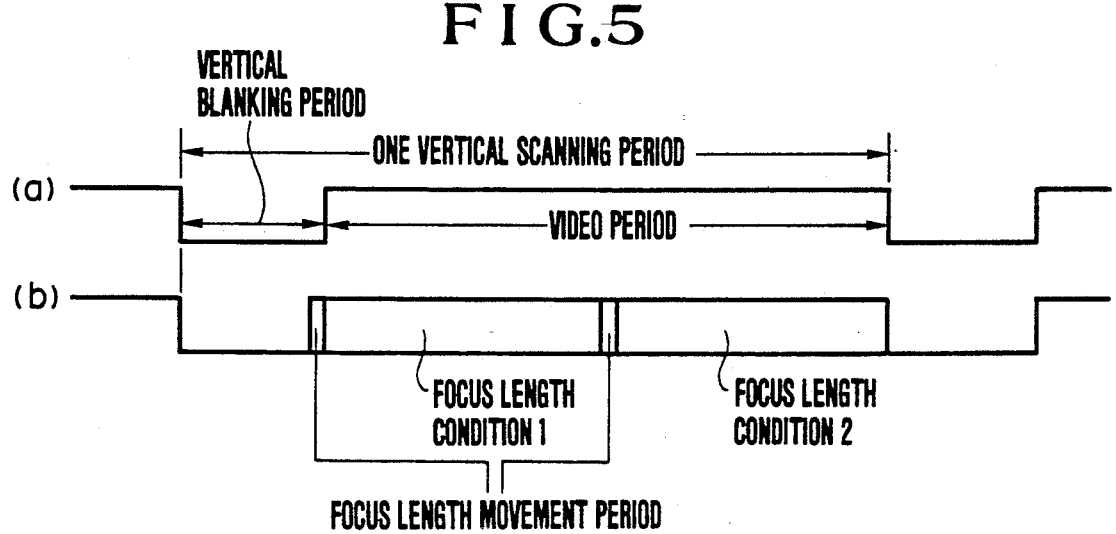

The embodiment of FIG. 23 is different in arrangement from the embodiment of FIG. 2 in the additional provision of a motion detection circuit 61. It is considered that the drive of the lens is, as shown in the embodiments of FIG. 3, FIG. 4 and FIG. 5, carried out at a two field period, or one half field period due to the double speed operation. Thus, one sheet of composite picture image is obtained by composing two sheets of continuous picture images. At this time, if there is a motion in an image, discontinuity may occur in the moving portion of the composite image in some cases. The motion detection circuit shown in FIG. 23 has a function of detecting the motion of an object from the obtained image signals, and of stopping both the control of the focal length position and the signal composition when detecting the motion of an image of interest. The decrease in the depth of field and resolution is detected mainly when an object is at rest, and therefore, even if the increase in the depth of field is stoped for a moving image, there is practically no problem.

Figure 24:
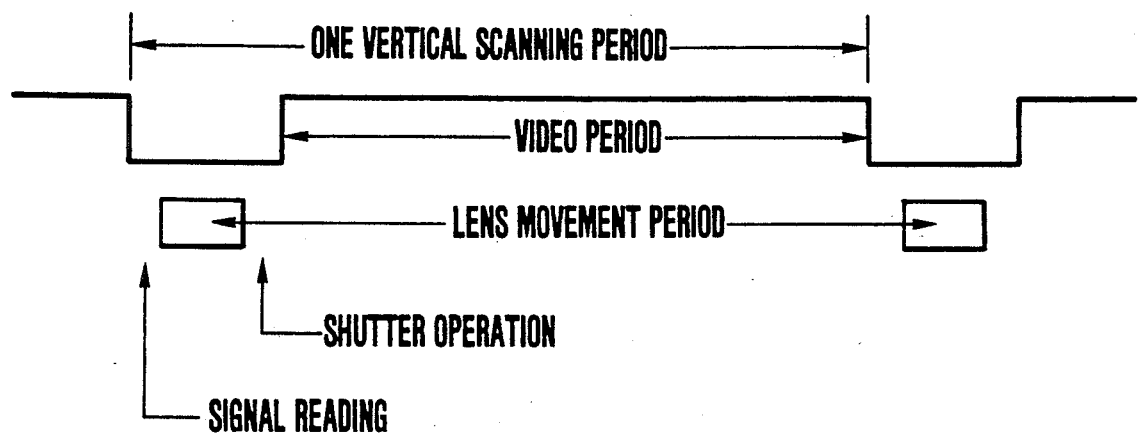
FIG. 24 is a timing chart showing the operation in which the shutter action of a solid-state image pickup device and the movement of a focal length are combined.

FIG. 24 is a timing chart showing an embodiment of a system for control of the focal length position, and image pickup which system is available when using a solid-state imaging device. In the case where a solid-state imaging device is used, a shutter operation can be readily performed. In the control of the focal length position according to the present invention, a transient focusing state is necessarily present between a time period of setting the best focal length position to a distant view and a time period of setting the best focal length position to a near view. The image at the transient focusing state includes therein image distortion and the like which are generated during movement of the lens, and when such an image is in the period of storage of an image pickup device, the picture quality is lowered. An electronic shutter function is used to remove the transient image signal. For that purpose, the lens or image pickup device begins to be driven immediately after reading out the signal. As soon as movement of the lens is completed, signal charges which have been stored are discharged with the shutter function, and the storage of the signal charges is started again. Such an operation can be realized by synchronizing the shutter operation and the lens drive with each other. The image signal at the transient state can be removed by the shutter operation, so that an image of high resolution is obtained.

Figure 25:
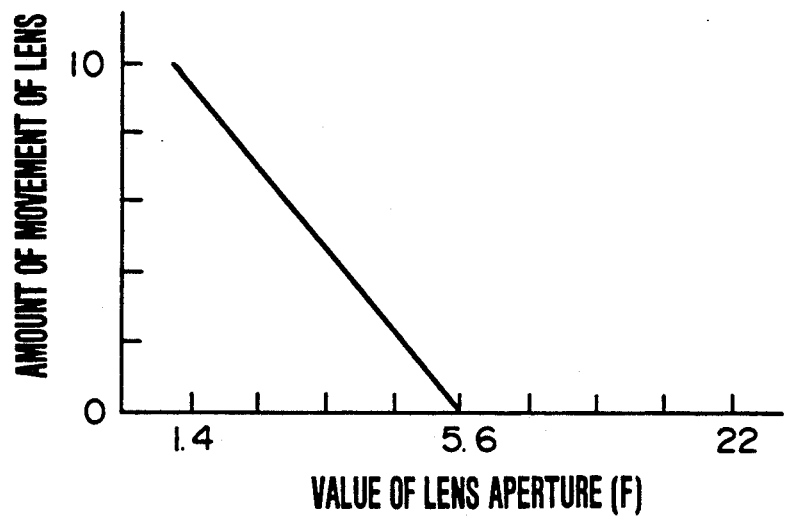
FIG. 25 is a graphical representation showing one example of control characteristics of change in focal length position vs. value of a lens aperture.

FIG. 25 is a graphical representation showing an embodiment of control characteristics of a change in the focal point or length position. The depth of field is changed depending on a value of the lens aperture. Therefore, in order to obtain the same depth of field, it is necessary to control the movement of the image pick up device by a value of the lens aperture. As shown in the embodiment of FIG. 25, the control is carried out in such a way that in a state in which the lens aperture is increased, the movement of the focal length position is increased, and conversely, in a state in which the lens aperture is decreased, the movement thereof is decreased. This allows a condition such as a fixed depth of field to be kept. Moreover, it is preferable that after reaching a value of the lens aperture (e.g., F=5.6) in which a practically sufficient depth of field can be obtained, the change of the focal point or length position is stopped to proceed to a normal image pickup operation. FIG. 25 shows one example of control characteristics, and the purpose of the present embodiment is that the amount of movement of the focal length position is controlled depending on the value of the lens aperture.

As another control method, it is considered that the range of the focal length position is controlled in conjunction with the motion of an object. In the case where a moving object is taken, a sufficient resolution cannot be obtained. In such a case, since the best focal point or length does not need to be set to a moving object, it is effective to control the focal length position in accordance with the motion of an object. Moreover, the control of the depth of field allows a shooting aiming at a special effect to be carried out. In this case, the control range of the focal length position may be freely set by a shooter.

Incidentally, description about many embodiments described above has been given mainly to the method of controlling the depth of field of a television camera. However, it is readily appreciated that the present invention can be applied to an electronic camera employing a lens and an image pickup device.

As set forth hereinabove, according to the present invention, it is possible to freely control the depth of field of a television camera apparatus irrespective of a value of a lens aperture. Therefore, an image signal corresponding to an image which has a great depth of field and is of high resolution is obtained while obtaining a high sensitivity with the lens aperture being increased. This is effective for highly improving a picture quality. Moreover, since the depth of field can be controlled to a desired amount for a shooter, there is an immeasurable effect in that the degree of freedom of a shooting is increased and a shooter aiming at a specific effect can be carried out, so that an increase in a range of utilizing a television camera can be realized.

What is claimed is:

1. A depth-of-field control apparatus used with an image pickup apparatus for a television provided with at least one camera lens and at least one image pickup device, said control apparatus comprising:
   means for changing a focal point or length position of said camera lens;
   means for producing a new image signal by composing image signals corresponding to a plurality of picture images different in focal point or length position, said image signals being obtained using said means for changing a focal point or length position; and
   means for controlling said image composition means, said control means including:
   means for detecting individual powers of said image signals corresponding to the plurality of picture images;
   means for comparing the individually detected powers for each minute area of the image signals with each other;
   means for detecting the position of an edge included in one of said image signals corresponding to the plurality of picture images; and
   means for producing a compensated signal for image composition in accordance with a selection of an image signal with the highest power produced by said power comparing means and by the edge position information obtained by said edge position detection means so that the compensated signal of the selected image signal remains the same within a continuous image area present between a pair of edges.

2. A depth-of-field control apparatus used with an image pickup apparatus for a television provided with at least one camera lens and at least one image pickup device, said control apparatus comprising:
   means for changing a focal point or length position of said camera lens;
   means for producing a new image signal by composing image signals corresponding to a plurality of picture images different in focal point or length position, said image signals being obtained using said means for changing a focal point or length position; and
   means for controlling said image composition means, said control means including:
   means for detecting individual powers of said image signals correspond to the plurality of picture images;
   means for comparing the individually detected powers for each minute area of the image signals with each other;
   means for detecting an area included in one of said image signals corresponding to the plurality of picture images, the individual colors of said detected area being similar to each other; and
   means for producing a compensated signal for images composition in accordance with a selection of an image signal with the highest power produced by said power comparing means and by the color information detected by said area detection means so that the compensated signal of the selected image signal remains the same within a continuous image area of the same color.

3. A depth-of-field control apparatus according to claim 2, wherein said control means further includes means for detecting the position of an edge included in the one of said image signals corresponding to the plurality of picture images, so that said compensated signal for the image composition is compensated by both said color information and the edge position information detected by said edge position detection means so that the compensated signal of the selected image signal remains the same within a continuous image area present between a pair of edges.

4. A depth-of-field control apparatus used with an image pickup apparatus for a television provided with at least one camera lens and one image pickup device, said control apparatus comprising:
   focal length changing means for performing a cyclic change of focal length of the camera lens among a plurality of focal length positions in synchronism with an integer multiple of a vertical scanning period of said television so that an image signal which sequentially indicates a plurality of picture images at respective focal length positions is outputted from the image pickup device;
   a plurality of image memories respectively storing the plurality of picture images sequentially outputted from the image pickup device;
   means for composing a new image signal indicating a composite picture image having an increased depth-of-field from said plurality of picture images read out from the image memories and for outputting the new image signal of the composite picture image in synchronism with the vertical scanning period of said television; and
   means for obtaining motion information of an object from a signal outputted from the image pickup device and for deactivating said focal length changing means when the motion information obtaining means detects the motion of said object,
   wherein the composing means stops composing the new image signal indicating the composite picture image of the increased depth-of-field and outputs an image signal indicating an image at a focal length position during the time period that the means for obtaining motion information detects the motion of the object.

5. A depth-of-field control apparatus according to claim 4, further comprising means for compensating image distortion due to a change of the focal length position, wherein after compensating for image distortion of the image signals corresponding to the plurality of picture images different in focal length position, a new composite image signal is obtained.

6. A depth-of-field control apparatus according to claim 5, wherein the composing means includes means for adding image signals corresponding to a plurality of picture images different in focal length position, the image signals being individually weighted.

* * * * *